(12) United States Patent
Sasaki

(10) Patent No.: US 10,609,249 B2
(45) Date of Patent: Mar. 31, 2020

(54) SCANNER AND SCANNING CONTROL PROGRAM WHICH OUTPUTS AN ORIGINAL IMAGE AND AN EXTRACTED IMAGE IN A SINGLE FILE

(71) Applicant: SEIKO EPSON CORPORATION, Tokyo (JP)

(72) Inventor: Atsushi Sasaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/835,896

(22) Filed: Dec. 8, 2017

(65) Prior Publication Data

US 2018/0213119 A1 Jul. 26, 2018

(30) Foreign Application Priority Data

Jan. 20, 2017 (JP) ................. 2017-008215

(51) Int. Cl.
*H04N 1/393* (2006.01)
*H04N 1/387* (2006.01)
*H04N 1/00* (2006.01)
*H04N 1/38* (2006.01)
*H04N 1/40* (2006.01)

(52) U.S. Cl.
CPC ....... *H04N 1/3935* (2013.01); *H04N 1/00801* (2013.01); *H04N 1/00816* (2013.01); *H04N 1/38* (2013.01); *H04N 1/3871* (2013.01); *H04N 1/40068* (2013.01)

(58) Field of Classification Search
CPC ............. H04N 1/3935; H04N 1/3871; H04N 1/00816; H04N 1/00801; H04N 1/38; H04N 1/40068
See application file for complete search history.

(56) References Cited

U.S. PATENT DOCUMENTS

| 2006/0222253 A1 | 10/2006 | Matsuda | |
|---|---|---|---|
| 2007/0258661 A1* | 11/2007 | Koshi | H04N 1/40068 382/298 |
| 2009/0190177 A1* | 7/2009 | Hayashi | H04N 1/21 358/1.16 |
| 2011/0044535 A1* | 2/2011 | Stevens | H04N 1/3871 382/162 |

FOREIGN PATENT DOCUMENTS

| CN | 104333698 A | 2/2015 |
|---|---|---|
| JP | 2007-206964 A | 8/2007 |

OTHER PUBLICATIONS

Anonymous: "Learning layer basics in Photophop"; XP055478981; Oct. 6, 2016 Retrieved from the Internet: https://web.archive.org/web/20161006212424/https://helpx.adobe.com/photoshop/using/layer-basics.html.
The Extended European Search Report for the corresponding European Patent Application No. 18152683.1 dated Jun. 11, 2018.

* cited by examiner

*Primary Examiner* — Christopher Wait

(74) *Attorney, Agent, or Firm* — Global IP Counselors, LLP

(57) ABSTRACT

A scanner has a processor configured to output, when a document is scanned, an original image, which is the image generated by scanning the document, and an extracted image, which is an image extracted from part of the original image, as a single file.

7 Claims, 4 Drawing Sheets

SCANNER AND SCANNING CONTROL PROGRAM WHICH OUTPUTS AN ORIGINAL IMAGE AND AN EXTRACTED IMAGE IN A SINGLE FILE

BACKGROUND

1. Technical Field

The present invention relates to a scanner, scanning control program, and image file generating method.

2. Related Art

Extracting part of an original image created by scanning a document, and separately storing the extracted image and the original image, is known from the literature. See, for example, JP-A-2007-206964.

SUMMARY

The invention provides a configuration enabling more easily using the original image and extracted image.

To achieve the foregoing objective, a scanner according to the invention has a first generator for scanning a document and generating an original image; a second generator for generating an extracted image from part of the original image; and an output module for outputting image data having the original image on a first layer and the extracted image on a second layer. In this configuration, both the original image and the extracted image are included on separate layers in the output image data. As a result, the user can easily use the original image and the extracted image by selecting the appropriate layer of the image data.

Preferably, the first layer may be configured to include an expanded image having white space added to the original image, and the vertical and horizontal pixel counts of the expanded image are the same as the vertical and horizontal pixel counts of the extracted image. If the extracted image and expanded image are superimposed with each other in this configuration, the images can be superimposed without one of the images extending beyond the outside edges of the other image.

In another aspect of the invention, the resolution of the original image on the first layer is a first resolution, which is the scanning resolution of the document, and the resolution of the extracted image on the second layer is a second resolution that is higher than the first resolution. When the extracted image is output (displayed or printed) in a format that can be seen (used) by the user, the size of the extracted image that is displayed or printed can be made close to the actual size of the part corresponding to the extracted image portion of the original image.

In another configuration, the extracted image is generated by enlarging the image so that the pixel count of one side of the image extracted from the original image is greater than or equal to the pixel count of one side of the original image. This configuration enables including the original image in the image data while maintaining the amount of information in the original image.

Further preferably, the first layer in the image data is above the second layer, and the transparency of the first layer is 100%. When the image data output from the output module is output (displayed or printed) in a format readable by the user in this configuration, the original image on the first layer is 100% transparent and cannot be seen by the user, but the extracted image included on the second layer can be seen by the user.

In another aspect of the invention, the second layer in the image data is above the first layer, and the transparency of the second layer is 0%. When the image data output from the output module is output (displayed or printed) in a format visible to the user in this configuration, the extracted image on the second layer is not transparent, and in at least the part superimposed with the original image on the lower first layer, the extracted image can be seen by the user and the original image cannot be seen.

Other objects and attainments together with a fuller understanding of the invention will become apparent and appreciated by referring to the following description and claims taken in conjunction with the accompanying drawings.

DESCRIPTION OF EMBODIMENTS

Figure 1:
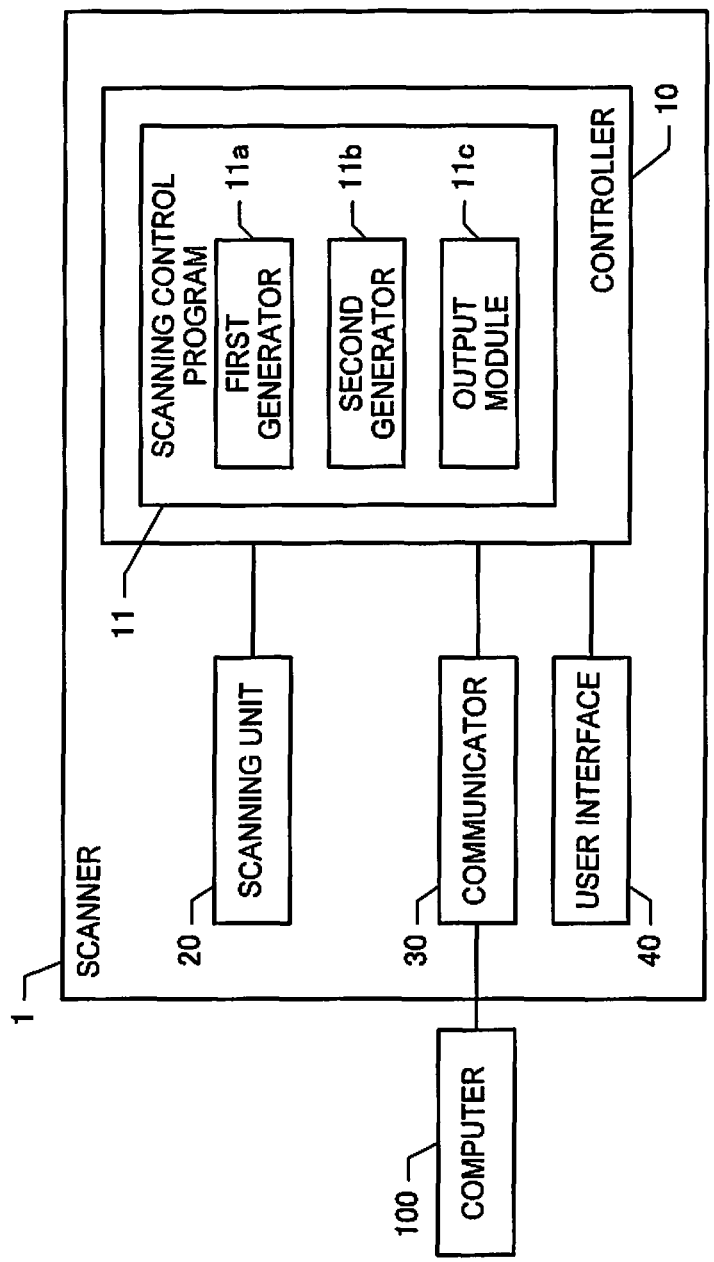
FIG. 1 is a block diagram of a scanner.

A preferred embodiment of the present invention is described below with reference to the accompanying figures. Note that like elements are identified by like reference numerals, and redundant description is omitted.

1. Embodiment 1

1-1. Configuration

FIG. 1 is a block diagram illustrating the configuration of a scanner 1 according to this embodiment of the invention. The scanner 1 includes a controller 10, scanning unit 20, communicator 30, and user interface 40.

The controller 10 includes a processor (CPU or ASIC, for example), RAM, ROM, or other memory, and controls operation of the scanner 1 by the CPU using RAM to execute control programs stored in ROM, for example. The control programs include a scanning control program 11 for executing the scanning process described below.

The user interface 40 may include a touch panel and keys. The controller 10 displays information on the touch panel based on the operating status of the scanner 1, and receives user commands input through the touch panel or keys.

The communicator 30 has a communication interface circuit for wired or wireless communication with a computer 100 or other external device. When a scan command is received from a user through the user interface 40, the controller 10 outputs control signals instructing scanning to the scanning unit 20 to execute the document scanning operation.

The scanning unit 20 includes a scanning platen on which the document is placed, a light source for illuminating the document, an image sensor for outputting signals corresponding to the light reflected from the document, an image processor for processing the output signals and generating an original image, a conveyance mechanism for moving a carriage carrying the light source and image sensor, and a conveyance mechanism for conveying the document.

The original image generated by the scanning unit 20 is included in a file of a specific format (such as a PDF file), and is output through the communicator 30 to the computer 100, for example. The file may be used in various ways, and may be written to a recording medium (not shown) of the scanner 1, stored to a removable recording medium, or sent through the communicator 30 to a device other than a computer 100, for example.

The scanner 1 according to this embodiment has a function for extracting part of the original image. The scanner 1 also has a function for creating and outputting a file (an example of image data) including both the original image and an extracted image, which is an extracted portion of the original image. The controller 10 executes the scanning control program 11 to use these functions. The scanning control program 11 includes a first generator 11a, second generator 11b, and output module 11c.

The first generator 11a causes the controller 10 to execute the function of scanning a document and creating an original image. The document is the object scanned by the scanner 1, and may be a business card, postcard, photograph, text document, or other sheet medium. If the document is smaller than the scanning size (such as A4 or B5), the original image will include a portion corresponding to the document, and a surrounding background portion. This embodiment describes a method of generating the image data when the document is smaller than the scanning size.

The second generator 11b causes the controller 10 to execute the function of generating an extracted image that is extracted from part of the original image. In this example, the controller 10, by the function of the second generator 11b, extracts a rectangular image including the portion corresponding to the document and excluding the background portion of the original image. In this example, the enlargement ratio is the greater of the vertical pixel count of the original image divided by the vertical pixel count of the extracted image, and the horizontal pixel count of the original image divided by the horizontal pixel count of the extracted image. Note that when any one side of the rectangular image is the vertical side, the side perpendicular thereto is the horizontal side. As a result, if the extracted image and original image are superimposed with each other, the original image will not protrude from the outside edges of the extracted image. Note that if configured to reduce the original image so that the original image does not protrude from the outside of the extracted image, the original image after being reduced will contain less information than the original image before being reduced. However, if the extracted image is enlarged instead of reducing the original image as in this example, the amount of information in the original image can be kept the same as in the scanned image.

The first generator 11a also causes the controller 10 to execute a function of adding white space to the original image to create an expanded image so that the same vertical and horizontal pixel counts are the same as in the extracted image. As a result, the vertical and horizontal pixel counts of the expanded image and extracted image are the same. More specifically, the vertical pixel count of the expanded image and the vertical pixel count of the extracted image, and the horizontal pixel count of the expanded image and the horizontal pixel count of the extracted image, are the same. Therefore, when the expanded image is superimposed with the extracted image, the images can be superimposed without the expanded image protruding from the extracted image, and without the extracted image protruding from the expanded image.

Note that the white space may be an image that can be differentiated from the original image, or an image that is not easily differentiated from the original image. For example, the white space may be a solid monochrome image of black or white. The white space may also contain a line indicating the border of the original image. The white space and original image may also be arranged as desired in the expanded image. For example, the white space may be added to any one side of the original image, or the white space may be placed to two parallel sides of the original image.

The output module 11c generates and outputs a file having the expanded image on a first layer, and the extracted image on a second layer. In addition to data identifying the expanded image and data identifying the extracted image, the file also contains layer information, information of the image on the first layer, and information of the image on the second layer. The layer information includes information about the layers, such as the order of the layers, and the transparency of the image on each layer. Note that in this example a layer refers to a layer in an image comprising multiple images placed one on top of another.

The information about the image on the first layer is information indicating specific attributes of the expanded image, which is the image on the first layer, such as the vertical and horizontal pixel counts of the expanded image, and the resolution of the expanded image.

The information about the image on the second layer is information indicating specific attributes of the extracted image, which is the image on the second layer, such as the vertical and horizontal pixel counts of the extracted image, and the resolution of the extracted image.

1-2. Scanning Process

Figure 2:
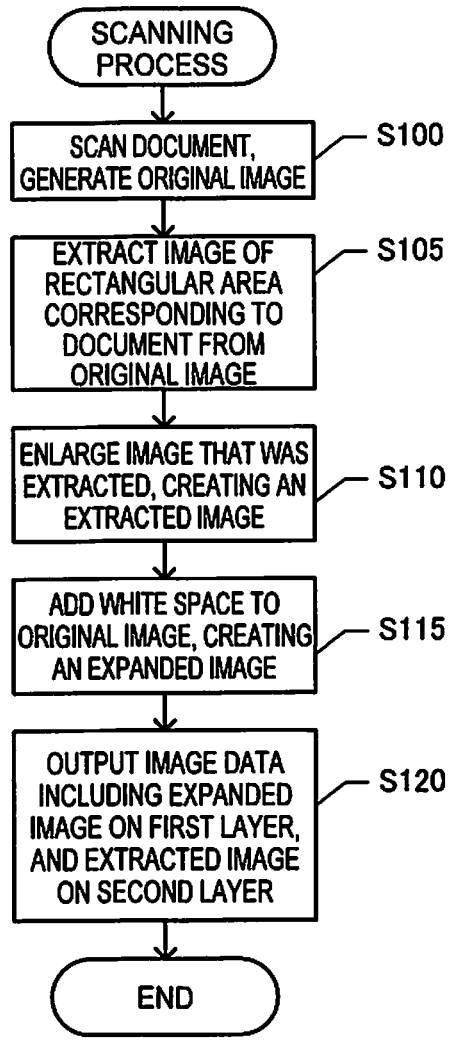
FIG. 2 is a flow chart of a scanning process.

FIG. 2 is a flow chart of the scanning process. The scanning process is executed when the user inputs a scan command through the user interface 40 after placing a document in the scanning unit 20.

When the scanning process starts, the controller 10, by a process of the first generator 11a, controls the scanning unit 20 to scan the document and generate an original image (step S100). More specifically, the controller 10 outputs to the scanning unit 20 a control signal specifying the scanning parameters, such as the scanning resolution and color or monochrome scanning setting, and instructing scanning. The scanning unit 20 then scans the document according to the control signal, and generates an original image.

Figure 3:
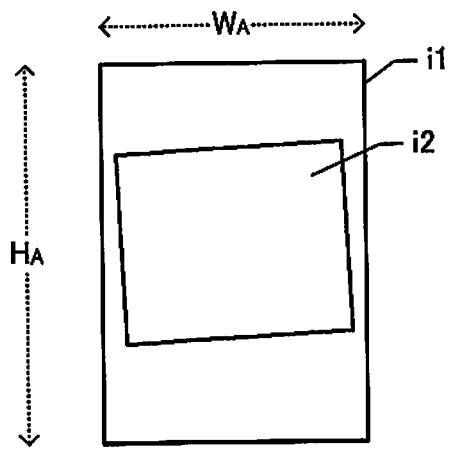
FIG. 3 shows an example of an original image.

FIG. 3 to FIG. 6 illustrate an original image, extracted image, and expanded image. The scanning process of this embodiment of the invention is described below with reference to FIG. 3 to FIG. 6. In this example the controller 10 controls the scanning unit 20 to scan the document at 300 dpi in step S100. The vertical and horizontal pixel counts of the original image i1 representing the scanned document are, as shown in FIG. 3, $H_A$ pixels and $W_A$ pixels. In this example, the vertical to horizontal pixel count ratio $H_A/W_A$ of the original image i1 is greater than 1 (that is, $H_A > W_A$).

Figure 4:
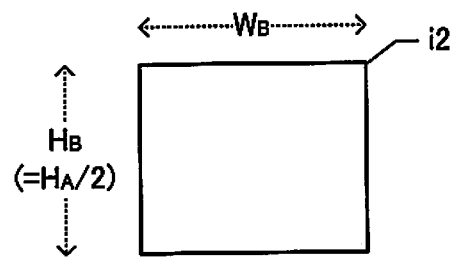
FIG. 4 illustrates an image extracted from the original image.
Figure 5:
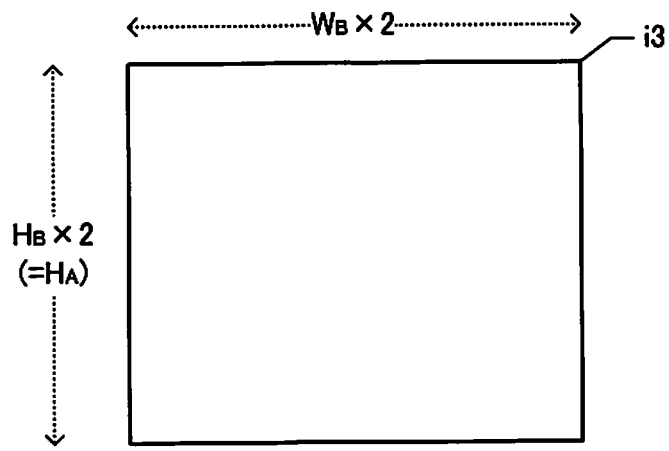
FIG. 5 illustrates the extracted image.

The controller 10, by the process of the second generator 11b, then extracts a rectangular image of the part corresponding to the document in the original image (step S105). That is, the controller 10 executes a process of analyzing the original image and separating the document image from the background image, and extracting the identified document image. If the document is skewed, the controller 10 deskews the image by rotating the extracted document image. Image i2 in FIG. 3 indicates the image corresponding to the document. The controller 10 extracts image i2 from original image i1. As shown in FIG. 4, the vertical and horizontal pixel counts of the image i2 are $H_B$ pixels and $W_B$ pixels, respectively. Note that in this example, the vertical pixel count $H_B$ of the image i2 is ½ the vertical pixel count $H_A$ of the original image i1. The vertical/horizontal pixel count ratio $H_B/W_B$ of the image i2 is less than 1 (that is, $H_B < W_B$).

Next, by a process of the second generator 11b, the controller 10 enlarges the image that was extracted and generates the expanded image (step S110). More specifically, the controller 10 enlarges the image i2 using whichever of $H_A/H_B$ and $W_A/W_B$ is greater as the pixel count of both vertical and horizontal sides. In this example, because $H_A/H_B$ is greater than $W_A/W_B$, $H_A/H_B$ (=2 times) is used as the enlargement ratio. More specifically, the image is enlarged so that the vertical pixel count $H_B$ of one side of the image i2 is increased to the same value as the vertical pixel count $H_A$ of one side of the original image i1. By using $H_A/H_B$ (=2 times) as the enlargement ratio, the horizontal pixel count $W_B$ of the image i2 is doubled to $2W_B$ as a result of enlargement. The controller 10 enlarges the image i2 by the enlargement ratio and generates extracted image i3 (FIG. 5) using an enlargement algorithm such as bicubic interpolation.

Figure 6:
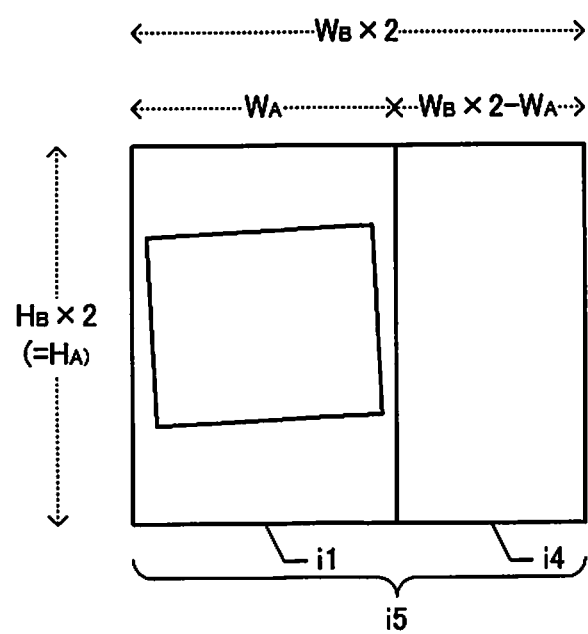
FIG. 6 illustrates an expanded image.

By a process of the first generator 11a, the controller 10 then generates an expanded image adding white space to the original image (step S115). The controller 10 adds white space i4 to the original image i1 as shown in FIG. 6 so that the vertical and horizontal pixel counts of the expanded image are the same as the vertical and horizontal pixel counts of the extracted image, producing expanded image i5. The process of steps S105 to S115 may also be executed by the image processor of the scanning unit 20 in response to a command of the controller 10.

In this embodiment, when the vertical length of the extracted image is greater than the vertical length of the original image ((vertical/horizontal of original image)<(vertical/horizontal of extracted image)), the controller 10 adds white space to at least one of the top and bottom of the original image (at least one side of the original image in the vertical direction), and does not add white space to the right and left sides of the original image (horizontal sides of the original image).

Furthermore, when the width of the extracted image is greater than the original image ((vertical/horizontal of original image)>(vertical/horizontal of extracted image)), the controller 10 adds white space to at least one of the right and left sides of the original image (at least one side of the original image in the horizontal direction), and does not add white space to the top and bottom sides of the original image (vertical sides of the original image).

When the vertical/horizontal ratio of the original image and the vertical/horizontal ratio of the extracted image are the same, the controller 10 uses the original image as the expanded image without adding white space to the original image.

By a process of the output module 11c, the controller 10 outputs an image including the expanded image on the first layer and the extracted image on the second layer (step S120). More specifically, the controller 10 generates a file including the expanded image i5 on the first layer and the extracted image i3 on the second layer. In the layer information of the generated file, the controller 10 writes information defining the order of the layers indicating that the first layer is the layer above the second layer. The controller 10 also writes to the layer information of the generated file information indicating that the transparency of the first layer is 100%, and the transparency of the second layer is 0%.

That the first layer is above the second layer means that when the image on the first layer and the image on the second layer are superimposed, the former (that is, the image on the first layer) is displayed with preference over the image on the second layer, but by setting the transparency of the first layer to 100%, the first layer image that would be displayed preferentially over the second layer image is transparent. The first layer image is therefore not displayed, and the user can see the image on the second layer.

In the information part of the image included on the first layer of the file, the controller 10 sets $H_A$ pixels as the vertical pixel count of the expanded image i5, $2W_A$ pixels as the horizontal pixel count, and 300 dpi (first resolution) as the resolution. In the information part of the image included on the second layer of the file, the controller 10 sets $H_A$ pixels as the vertical pixel count of the extracted image i3, $2W_B$ pixels as the horizontal pixel count, and 600 dpi (second resolution) as the resolution.

The extracted image i3 is an image extracted from the original image i1 and enlarged so that the vertical and horizontal pixel counts of the image i2 that was extracted are both doubled, and the resolution of the extracted image i3 is set to 600 dpi, which is twice the resolution (300 dpi) of the image i2 that was extracted. More specifically, the second resolution is set so that the (second resolution/first resolution) is equal to the (pixel count of one side of the extracted image)/(pixel count of the side of the image extracted from the original image corresponding to the same side of the extracted image). As a result, information indicating the original size of the document can be maintained.

As described above, the file generated by the scanner 1 is output to an external device such as a computer 100, tablet computer, smartphone, or an external storage medium such as a memory card. The user can then view the file by using a viewer program that runs on the external device. The viewer program references the layer information part of the file and the information parts of the images on each layer to display the images. More specifically, the extracted image i3 contained on the second layer is displayed. The expanded image contained on the first layer is written to the layer above the second layer, but is not displayed because the transparency is set to 100%. As a result, the user can view the extracted image on the display by opening the file in the viewer program. The user can also acquire a printout of the extracted image by printing the file.

Furthermore, because the resolution of the extracted image (second resolution) is included in the file, and the resolution is updated to express the actual size of the document as described above, the actual size of the document (the area corresponding to the extracted image i3 contained in the original image) can be reproduced based on the updated resolution when the file is displayed or printed. More specifically, in this example the scanning resolution of the image i2 of vertical pixel count $H_B$ and horizontal pixel count $W_B$ is 300 dpi. The length of the vertical side of the image i2 (the side corresponding to the vertical edge of the document) is therefore $H_B/300$ inches. The resolution of the extracted image i3 of vertical pixel count $2H_B$ and horizontal pixel count $2W_B$ is 600 dpi. Therefore, the actual size of the document can be reproduced when printing the extracted image i3, for example, by making the side corresponding to the vertical axis of the extracted image i3 in the printout (the side corresponding to the vertical edge of the document) 2HB/600 (=$H_B/300$) inches based on the updated resolution.

Furthermore, by opening the file (the file generated by the scanning process) through an image editor program having a function for changing the content of the layer information part, the user can display the expanded image that is normally not displayed, and print the expanded image that is not normally printed. More specifically, the image editor program is configured to enable changing the order of the layers or layer transparency (to display or not display). Therefore, even if a file including, on the second layer, an extracted image that is missing part of the document because of an error during the recognition process of the second generator 11b in the process of extracting an image of the portion corresponding to the document in the original image, the user, by using the image editor program, can easily view or print the original image that is contained on the first layer. Because the pixel count of the original image contained in the file is the pixel count when the image was scanned, the user can use the original image retaining the same amount of information as when the document was scanned. More specifically, the user can reproduce the document from the original image contained on the first layer. Using the image editor program, the user can also extract the expanded image, and apply various image processes, including manually extracting the portion corresponding to the scanned document. As a result, an image of the document can be acquired without loss even if the file is generated with an extracted image missing part of the document included on the second layer.

Furthermore, because the original image and extracted image are included in a single file in this embodiment of the invention, managing a single file containing the original image and extracted image is easier for the user than when the images are stored in separate files.

2. Other Embodiments

A preferred embodiment of the invention is described above, and can be varied in many ways. For example, at least part of the processes of the first generator 11a, second generator 11b, and output module 11c may be executed by an image processing circuit of the scanning unit 20. The scanning control program may also be executed by a device connected to the scanner 1, such as a smartphone, tablet computer, or personal computer. For example, scanning is done by the scanner 1, but the scanner 1 may output the original image to an external device. When an original image is input from the scanner 1 to the external device, the external device then executes the processes starting from image extraction in step S105, and outputs a file containing the original image and extracted image to an internal storage medium (a hard disk drive or flash memory of the external device, for example), or an external storage medium. Once the user instructs starting scanning, these processes are preferably executed automatically until the file is output without user intervention unless an error occurs.

The foregoing embodiment describes writing information indicating that the first layer is above the second layer as the order of layers, and information setting the transparency of the first layer to 100% and the transparency of the second layer to 0%, in the layer information part of the file, but information indicating that the second layer is above the first layer may be written as the order of layers. In this case, information setting the transparency of the second layer to 0% (that is, opaque) is written to the layer information part of the file. The transparency of the first layer may be set to 100%.

The image data can be configured in various ways insofar as the original image is on a first layer and the extracted image is on a second layer. For example, the foregoing embodiment describes a configuration writing both images to a single file, but the image data may be configured with the original image in one file and the extracted image in another file. Even when the images are in separate files, the image data may be configured so that the original image acquired from the file containing the original image is the image on a first layer, and the extracted image acquired from the file containing the extracted image is the image contained on the second layer.

Configurations in which the transparency of a layer is set in units other than layers are also conceivable. For example, transparency may be defined for each pixel of the image on each layer. Further alternatively, transparency may be set in some other unit of the images on each layer, such as processing block units or image area units.

The original image may be an image configured in various ways including the document. For example, there may be one document or multiple documents included in the original image.

The extracted image may be any image created by extracting part of the original image. For example, as described above, the extracted image may be the image generated by extracting and enlarging the image in the area corresponding to the scanned document in the original image, which is the part equal to the scanning size (scanning area) of the scanning unit 20. Alternatively, a portion of the part corresponding to the document may be extracted and enlarged as the extracted image.

Furthermore, when multiple documents are included in the original image of one page, and when multiple images to be extracted are included in a document, multiple extracted images may be generated. The image data may be generated to include multiple extracted images on one layer, or one layer may be assigned to each extracted image. The order and transparency of the layers may also be set in a predetermined order of priority. Alternatively, multiple extracted images may be output to separate individual files (a file having a layer containing one extracted image and a layer including the original image).

When a document with multiple pages is scanned in a continuous operation, a single file having multiple layers on each page, and the original image and an extracted image contained on each layer, may be generated and output.

The foregoing embodiment describes a configuration generating an expanded image with white space added to the original image, and the vertical and horizontal pixel counts the same as the vertical and horizontal pixel counts of the extracted image, but other configurations are conceivable. For example, the extracted image may be an image extracted from part of the original image (not enlarged as in the embodiment described above). In this case, a second expanded image, which is a second expanded image adding second white space (second white image) to the extracted image, and having the same vertical and horizontal pixel counts as the vertical and horizontal pixel counts of the original image, may be generated. Image data having the original image on the first layer, and the second expanded image on the second layer, is then generated. In this case, the resolution of the original image on the first layer, and the resolution of the second expanded image on the second layer, may be the same as the scanning resolution.

The extracted image may also be generated by enlarging the image extracted from the original image so that the pixel count of one side of the image extracted from the original image is greater than or equal to the pixel count of one side of the original image. If the original image is reduced so that the pixel count of one side of the original image is less than or equal to the pixel count of the one side of the image extracted from the original image, the amount of information about the original image decreases, but because the original image is not reduced in this configuration, the amount of original image information is maintained. The original image can therefore be included in the image data while maintaining the same amount of original image information.

In this configuration, the side of the image extracted from the original image may be the vertical side or the horizontal side, and the side of the original image may be the vertical side or the horizontal side. Therefore, if either the ratio of the vertical and horizontal pixel counts of the image extracted from the original image, and the ratio of the vertical and horizontal pixel counts of the original image, is greater than 1 and the ratio of the other is less than 1, the extracted image may be enlarged after rotating one of the images 90 degrees (so that the vertical side becomes the horizontal side).

For example, in FIG. 3 to FIG. 6, the vertical to horizontal pixel count ratio $H_A/W_A$ of the original image i1 is greater than 1, and the vertical to horizontal pixel count ratio $H_B/W_B$ of the extracted image i2 is less than 1. In this case, the side of the extracted image i2 corresponding to the vertical in FIG. 4 (the side of pixel count $H_B$) is made the horizontal side, and the side corresponding to the horizontal in FIG. 4 (the side of pixel count $W_B$) is made the vertical side, and the image i2 may be enlarged using whichever of $H_A/W_B$ and $W_A/H_B$ is greater as the enlargement ratio. In this case, the data size of the extracted image and the expanded image can be reduced compared with the first embodiment described above.

The resolution of the original image on the first layer may be a first resolution, which is the resolution at which the document was scanned, and the resolution of the extracted image on the second layer may be a second resolution that is higher than first resolution. That is, when the extracted image is generated by enlarging an image extracted from part of the original image, the resolution (second resolution) of the extracted image may be changed to a value higher than the resolution (first resolution) at which the document was scanned. A high resolution means that the pixel density is high.

Even if the resolution of the extracted image is not changed and remains the first resolution, when the extracted image is displayed or printed, the extracted image will be output larger than the actual size of the part of the original image corresponding to the extracted image. By the scanner having a configuration for setting the second resolution higher than the first resolution, when the extracted image is output (displayed or printed), the size of the extracted image that is displayed or printed can be made close to the actual size of the part of the original image corresponding to the extracted image.

Note that the second resolution is preferably set so that the value of the (second resolution/first resolution) is equal to, or substantially equal to, the value of the (pixel count of one side of the extracted image)/(pixel count of the side of the image extracted from the original image corresponding to the one side of the extracted image).

The function of parts described in the accompanying claims may be embodied by hardware assets of which the function is defined by the hardware configuration, hardware assets of which the function is defined by a program, or a combination thereof. The functions of these parts are not limited to embodiments by physically discrete, independent hardware assets. A single function may also be embodied by the cooperation of hardware assets contained in physically independent bodies.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanner comprising: a processor configured to output an original image and an extracted image as a single file, the original image is generated by scanning a document and the extracted image is an image extracted from part of the original image, wherein the processor outputs the single file including the original image as a first layer, and the extracted image as a second layer, and the processor generates the extracted image by enlarging an image extracted from the original image so that the pixel count of one side of the image extracted from the original image is greater than or equal to the pixel count of one side of the original image.

2. The scanner described in claim 1, wherein the processor outputs the first layer including an expanded image adding white space to the original image as part of the single file, and the vertical and horizontal pixel counts of the expanded image are the same as the vertical and horizontal pixel counts of the extracted image.

3. The scanner described in claim 1, wherein the processor outputs, as a single file, the original image at a first resolution, which is the scanning resolution of the original image, and the extracted image at a second resolution, which is a higher resolution than the first resolution.

4. The scanner described in claim 1, wherein the processor outputs, included in the single file, information indicating the first layer is above the second layer, and the transparency of the first layer is 100%.

5. The scanner described in claim 1, wherein the processor outputs, included in the single file, information indicating the second layer is above the first layer, and the transparency of the second layer is 0%.

6. A non-transitory storage medium storing a scanning control program configured to, when read and executed by a computer, output, in response to input of an original image, the original image and an extracted image as a single file, the original image being an image generated by scanning a document, and the extracted image being an image extracted from part of the original image, and the single file including the original image as a first layer, and the extracted image as a second layer, the scanning control program further generating the extracted image by enlarging an image extracted from the original image so that the pixel count of one side of the image extracted from the original image is greater than or equal to the pixel count of one side of the original image.

7. A non-transitory storage medium storing a scanning control program configured to, when read and executed by a computer, output, in response to input of an original image, the original image and an extracted image as a single PDF file, the original image being an image generated by scanning a document, and the extracted image being an image extracted from part of the original image, the scanning control program further generating the extracted image by enlarging an image extracted from the original image so that the pixel count of one side of the image extracted from the original image is greater than or equal to the pixel count of one side of the original image.

* * * * *